United States Patent [19]

Lang et al.

[11] Patent Number: 4,489,311
[45] Date of Patent: Dec. 18, 1984

[54] ENGINE OIL PRESSURE MONITOR

[75] Inventors: Stephen P. Lang, Waterloo; Yolanda E. Martin, Cedar Falls; Richard G. Norton, Hudson, all of Iowa

[73] Assignee: Deere & Company, Moline, Ill.

[21] Appl. No.: 378,704

[22] Filed: May 17, 1982

[51] Int. Cl.³ .................. G08B 23/00; B60Q 1/00
[52] U.S. Cl. ........................ 340/501; 340/52 R; 340/57; 340/60; 340/588; 340/591; 340/611; 340/626; 340/670; 340/677; 180/179; 180/282
[58] Field of Search ............ 340/501, 57, 60, 59, 340/588, 589, 591, 596, 611, 614, 626, 670; 180/170, 282, 175–177, 179

[56] References Cited

U.S. PATENT DOCUMENTS

| | | | |
|---|---|---|---|
| 3,631,388 | 12/1971 | Strong | 340/52 F |
| 3,723,964 | 3/1973 | Lace | 340/52 F |
| 3,893,108 | 7/1975 | McBride, Jr. et al. | 340/57 |
| 3,906,437 | 9/1975 | Brandwein et al. | 340/27 |
| 3,927,390 | 12/1975 | Hill | 340/52 F |
| 3,944,969 | 3/1976 | Arai et al. | 340/52 F |
| 4,003,019 | 1/1977 | Tronel | 340/52 F |
| 4,021,794 | 5/1977 | Carlson | 340/522 |
| 4,184,146 | 1/1980 | Fratzke et al. | 340/52 F |
| 4,215,404 | 7/1980 | Bukhtiyarov et al. | 340/52 R |
| 4,216,524 | 8/1980 | Leveraus | 362/61 |
| 4,328,480 | 5/1982 | Keitel et al. | 340/52 F |
| 4,348,653 | 9/1982 | Tsuzuki et al. | 340/57 |
| 4,359,716 | 11/1982 | Miyamaru et al. | 340/60 |

Primary Examiner—Donnie L. Crosland

[57] ABSTRACT

An engine oil pressure monitor includes an engine oil pressure sensor and an engine speed sensor. A plurality of pressure alarm values are generated to correspond to designated distinct ranges of engine speed. One of the alarm values is selected according to which engine speed range contains the sensed engine speed. An alarm signal is generated when the sensed pressure falls below the alarm value. The alarm is disabled when the engine speed falls below a minimum non-zero engine speed and is disabled unless the pressure failure condition persists for at least a predetermined time period.

3 Claims, 4 Drawing Figures

ENGINE OIL PRESSURE MONITOR

BACKGROUND OF THE INVENTION

The present invention relates to a system for monitoring the engine oil pressure of an engine-driven vehicle.

It is now possible, due to microprocessor technology, to monitor various vehicle operating parameters according to complex criteria. For example, a transmission oil pressure monitoring system is described in copending U.S. patent application, Ser. No. 379,230, filed May 17, 1982, a clutch monitoring system is described in copending U.S. patent application, Ser. No. 379,231, filed May 17, 1982, and a filter monitoring system is described in copending U.S. patent application, Ser. No. 378,703, filed May 17, 1982, all assigned to the assignee of the present invention. However, none of these monitoring systems provide an indication of the engine oil pressure in the vehicle. However, it has heretofore been common to monitor engine oil pressure in vehicles because of the critical dependence of engine operation upon sufficient engine oil pressure. Most such monitoring systems included oil pressure-actuated switches. However, such switches are designed to open or close at set pressure levels and are therefore likely to give misleading indications when low oil pressure is permissable due to low engine speeds or light loads. Furthermore, such switches can fail to inform the operator of hazardous oil pressure conditions at high engine speeds and high loads where the oil pressure is above the pressure threshold of the switch, but below what is required for safe, high-speed engine operation.

It has also been suggested to monitor engine oil pressure via analog pressure sensors and displays, as described in U.S. Pat. No. 3,906,437. However, such analog displays merely display the sensed oil pressure and therefore, the operator must rely upon his experience and judgement as to when a dangerous condition exists. Furthermore, such systems do not provide the needed warning signal when the sensed engine oil pressure exceeds an engine speed dependent threshold level.

Another alternative is disclosed in U.S. Pat. No. 3,723,964 wherein an alarm is energized when a difference signal derived from engine oil pressure and temperature sensors exceeds a signal from an engine speed sensor. However, this alternative requires four sensors for oil pressure, oil and ambient temperature and engine speed. Furthermore, it could produce unnecessary and misleading warning signals because it does not prevent generation of warning signals whenever the engine speed is below a predetermined non-zero cut-off level.

SUMMARY OF THE INVENTION

It is an object of the present invention to provide a microprocessor-based engine oil pressure monitoring system.

Another object of this invention is to provide an engine oil pressure monitor which compensates for variations in vehicle engine speed and which prevents generation of misleading warning signals.

Accordingly, these and other objects are achieved by the present invention which includes an engine oil pressure sensor and an engine speed sensor. Depending upon the sensed engine speed, various pressure alarm values are determined. Between upper and lower engine speeds, the alarm values are calculated proportional to the engine speed. Alarm signals are generated if the sensed oil pressure falls below the appropriate alarm value. No alarm is generated if the engine speed is less than a low engine speed threshold.

DETAILED DESCRIPTION

Figure 1:
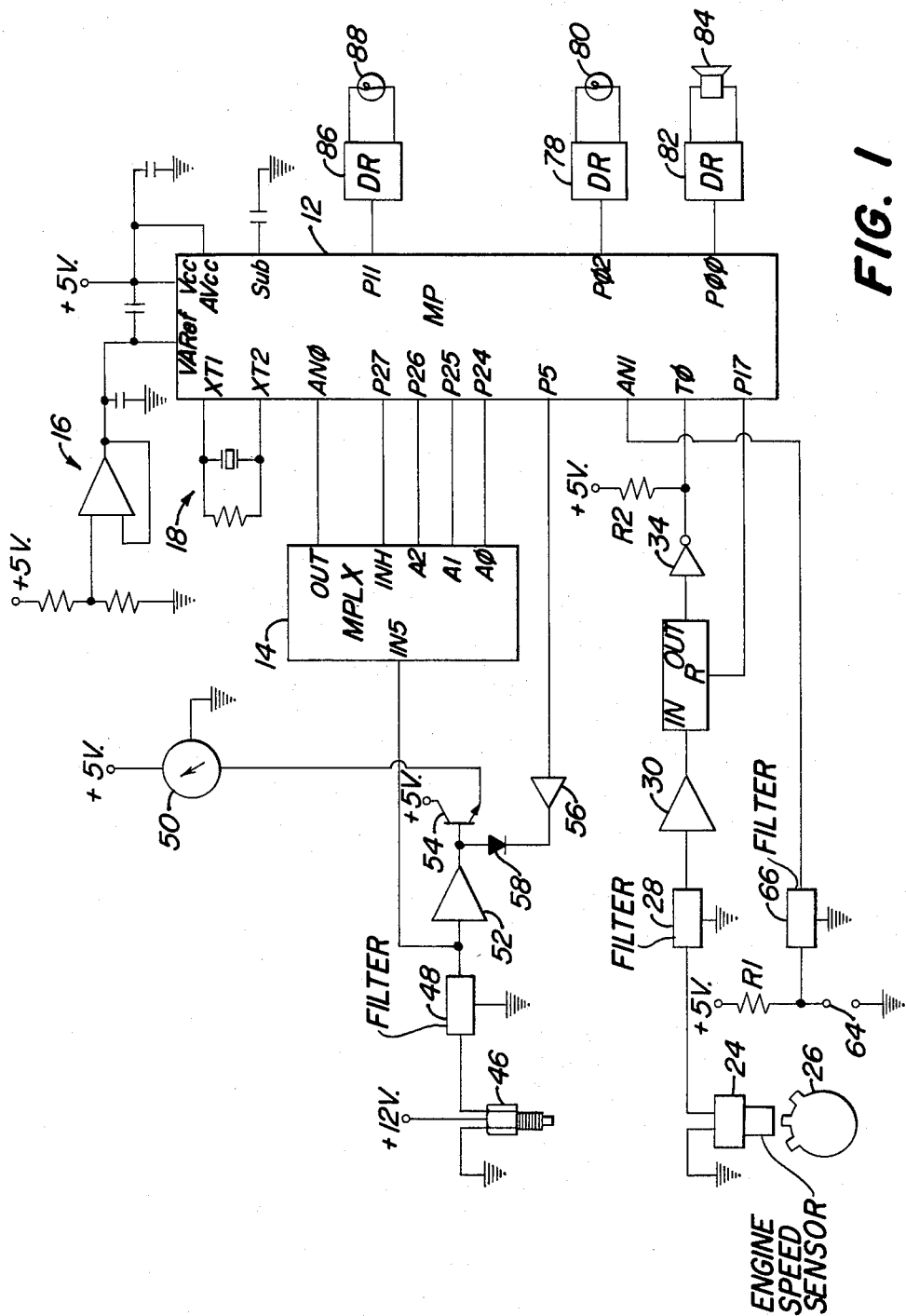
FIG. 1 is a schematic block diagram of a monitoring system constructed according to the present invention.

The monitoring system 10 includes a conventional microprocessor 12, such as Intel's 8022 A/D Converter and Microprocessor, coupled to a conventional 8-to-1 analog multiplexer 14, such as is available from National Semiconductor or Motorola. A regulating circuit 16 provides a regulated 4-volt reference voltage to the VARef input of the microprocessor 12 for use as a reference voltage in its internal A-to-D converter. A crystal circuit 18 provides a 3.6 MHz clock signal for the microprocessor 12. Terminals P24–P27 of the micro 12 are connected to corresponding address terminals of the multiplexer 14.

Data representing the engine speed is derived from sensor 24 and counter 32 in the following manner: A time interval is defined by the time required for consecutive pulses to be generated at the out terminal of the counter 32. This interval is thus proportional to the time required for 10 pulses to be generated by sensor 24, and is therefore inversely proportional to the rotational speed of the timing gear 26 and of the engine. A value representing engine speed may then be obtained by applying appropriate scaling factors to the inverse of the time interval. As part of this procedure, the counter 32 periodically receives reset signals at its reset R input from the P17 terminal of the microprocessor 12 so that it can respond to further groups of 10 pulses from sensor 24.

An engine oil pressure sensor 46 is coupled to the IN5 input of the multiplexer 14 via conventional electromagnetic interference (EMI) filter 48. The sensor 46 is of the capacitive diaphragm-type and includes an integral electronic module which generates a d.c voltage proportional to the sensed pressure. The output of filter 48 is also coupled to an analog-type display or meter device 50 via amplifier 52 and meter driver transistor 54. A P05 output of the micro 12 is coupled to the base of transistor 54 via amplifier 56 and diode 58.

A programming pin 64 is coupled to +5 volts via pull-up resistor R1 and is coupled to the AN1 input of the micro 12 via EMI filter 66.

Output P11 of micro 12 is coupled to a lamp driver 86 which drives a lamp or other operator-detectable or observable indicating device. The lamp 86 is preferably designated as an "engine oil pressure light".

Output P02 of the micro 12 is coupled to a similar driver and lamp, 78 and 80, where the lamp 80 is preferably identified as the "stop engine light". Output P00 is coupled via driver 82 to an audible warning device, such as a horn 84. The indicating devices 80, 84 and 88 are all preferably located in the vehicle operator's compartment (not shown).

Figure 2A:
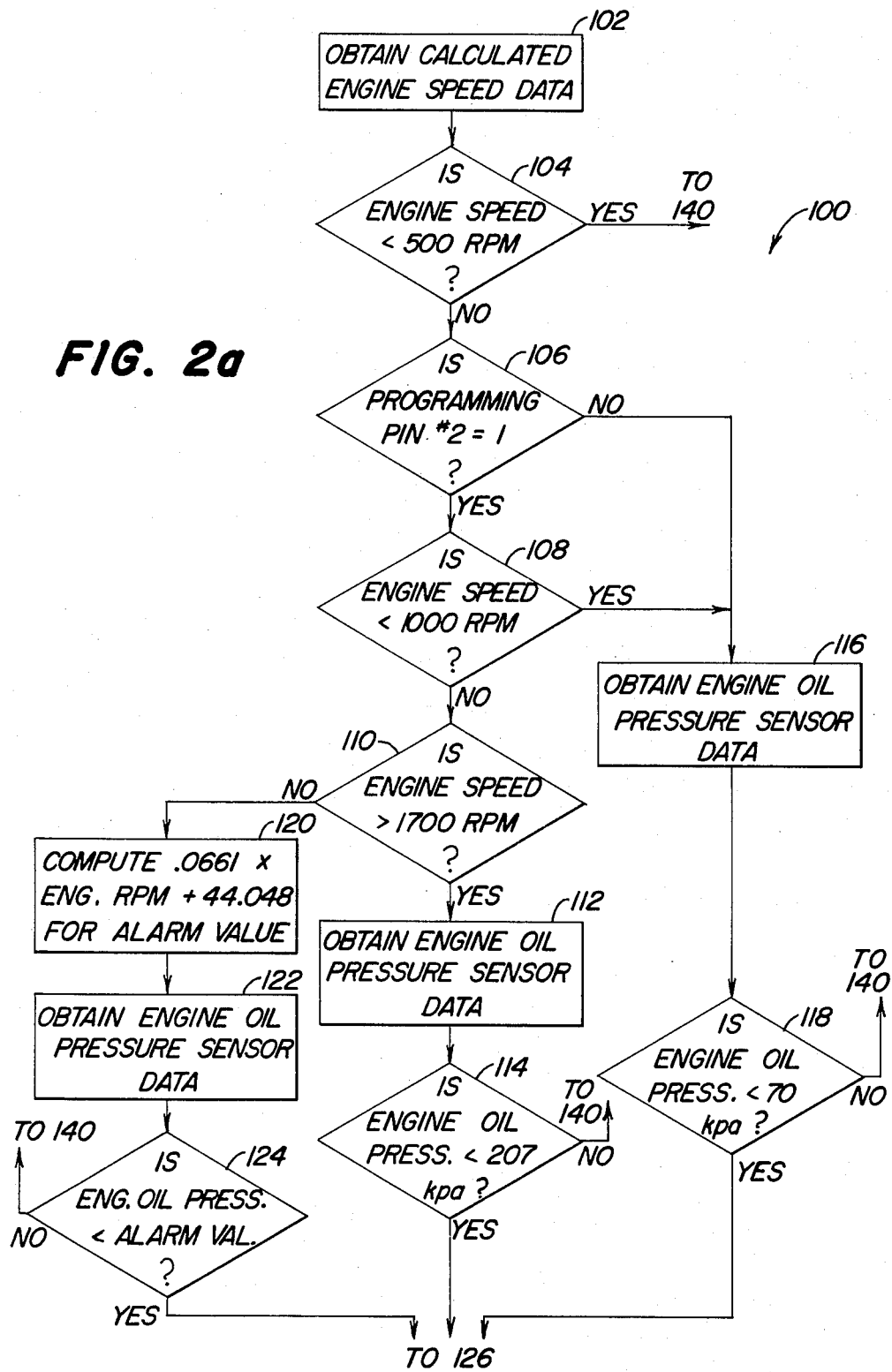
FIGS. 2a and 2b are flow charts illustrating the operational program contained in the microprocessor of the present invention.
Figure 2B:
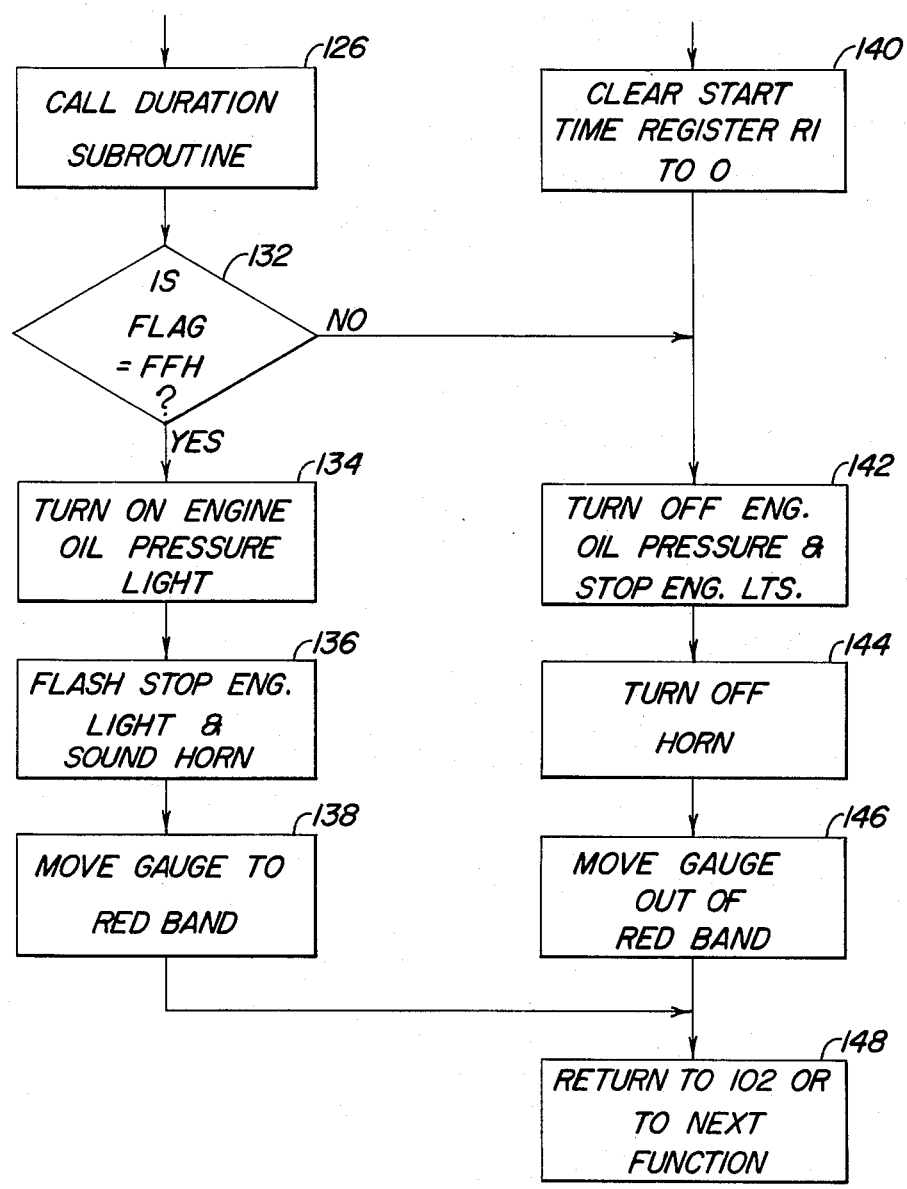
Figure 3:
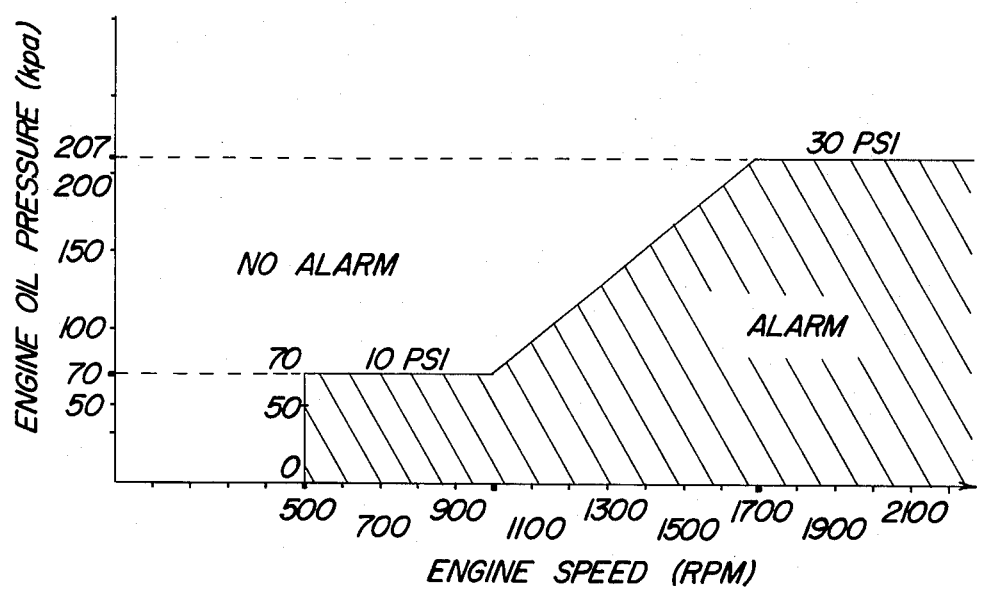
FIG. 3 is a graphic representation of the function of the present invention.

The monitoring system 10 performs a monitoring function by carrying out an operational program 100 which is contained in the memory of the microprocessor 12. This operational program will be described with reference to the flow chart shown in FIGS. 2a and 2b.

The program or routine 100 begins at step 102 wherein data from the engine speed sensor 24 is obtained. In step 104, if the engine speed is less than 500 rpm, the routine proceeds to steps 140–146. In step 140, a duration start time register R1 (not shown) is reset or cleared to 0 so that when a failure condition occurs, a duration subroutine, entered via step 126, prevents generation of warning signals unless the failure condition persists for a certain time period. The duration subroutine, which will be briefly described later, is described in detail in co-pending U.S. application, Ser. No. 379,230, filed May 17, 1982, which is incorporated by reference herein. After step 140, the engine oil pressure light 88, the stop engine light 80 and the horn 84 are de-energized as per steps 142 and 144. Step 146 directs that the pointer of gauge 50 be moved out of a red or "danger" zone. Step 148 then either routes the program back to step 102 or to another monitoring program (not shown) if additional monitoring functions are programmed into the micro 12.

At step 106, the status of programming pin 64 is determined. If pin 64 is not coupled to ground, then the routine proceeds to step 116 whereupon an oil pressure reading is obtained from sensor 46. Then, from step 118, the routine proceeds to previously described step 140 if the sensed engine oil pressure is not less than a low pressure alarm value of 70 kPa, else, the routine proceeds to step 126. However, if pin 64 is grounded, then the routine proceeds to step 108.

If, in step 108, the sensed engine speed is less than 1000 rpm, then the routine proceeds to previously described steps 116 and 118, otherwise the routine proceeds to step 110. If, in step 110, the engine speed is not greater than 1700 rpm, then the routine proceeds to steps 120–124, otherwise the routine proceeds to step 112. In step 120, an oil pressure alarm value, Pa, is calculated by the equation, Pa=44.048+(Engine rpm×0.0661). Then, the engine oil pressure reading is obtained in step 122 and thus, value is compared to the alarm value, Pa, in step 124. If the reading is not less than the alarm value, then the routine proceeds to previously described step 140. However, if the pressure reading is less than the alarm value, then the routine proceeds to step 126. In step 112, the engine oil pressure reading is obtained and then compared in step 114 to a high pressure alarm limit of 207 kPa. If the reading is not less than 207 kPa, then the routine proceeds to previously described step 140, else, the routine proceeds to step 126.

In step 126, the duration subroutine is called. Briefly, the duration subroutine clears an accumulator to zero if the desired duration period, for example, 0.5 seconds, has not expired. If the desired duration period has expired, the duration subroutine sets the accumulator to FFH, which is a hexadecimal term meaning that the accumulator contains nothing but binary 1 values. If the duration period has not expired and the acccumulator is set to zero, then step 132 causes the routine to proceed to previously described steps 142–148, and no warning signals are generated.

However, if the duration period has expired and the accumulator is set to FFH, then step 132 causes the routine to proceed to step 134, which causes a signal to be generated at the P11 output of micro 12 to turn on the engine oil pressure warning light 88. Next, step 136 causes a signal to be generated at the P3 and P4 outputs to energize the stop engine light 80 and the horn 84. Then, in step 136, a signal is generated at the P5 output of micro 12 to cut off driver transistor 54 so that the needle of gauge 50 goes into a "red" or "danger" zone.

In this manner, the program 100 and the duration subroutine operate to generate a plurality of pressure alarm values, depending upon which of a plurality of ranges the engine speed falls. An alarm signal is generated only if the sensed oil pressure falls below the particular alarm value. The delay subroutine and steps 132 and 140–146 operate to prevent generation of an alarm signal unless a pressure failure condition persists continuously for at least the predetermined duration period. Steps 104 and 140–146 operate to prevent generation of a warning signal when the engine speed is lower than 500 rpm, thus preventing misleading warning signals from being generated. FIG. 4 graphically illustrates the pressure and engine speed dependence of the alarm signal, the shaded area of FIG. 4 indicating the conditions where an alarm signal is generated. If programming pin 64 is grounded, then the equation in step 120 is circumvented and an alarm signal will be generated whenever the engine oil pressure is continuously below a constant (not compensated for engine speed) threshold pressure of 70 kPa while the engine speed is at least 500 rpm.

The conversion of the above flow chart into a standard language for implementing the algorithm described by the flow chart in a digital data processor, such as the microprocessor 12, will be evident to those with ordinary skill in the art.

While the invention has been described in conjuction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. An engine oil pressure monitor comprising:
   means for sensing engine speed;
   means for sensing engine oil pressure;
   means for preventing generation of a warning signal when the sensed engine speed is less than non-zero first threshold speed;
   means for generating a first predetermined constant pressure alarm value when the sensed engine speed is in a first range above the first threshold speed and below a second threshold speed;
   means for generating a variable pressure alarm value which is proportional to sensed engine speed when the sensed engine speed is in a second range above the second threshold speed and below a third threshold speed;
   means for generating a second predetermined constant pressure alarm value when the sensed engine speed is in a third range above the third threshold speed;
   means for selecting one of the pressure alarm values corresponding to the engine speed range which contains the sensed engine speed; and
   means for comparing the sensed oil pressure to the selected alarm value and for generating warning signals when the sensed oil pressure is less than the selected alarm value.

2. The oil pressure monitor of claim 1, further comprising:

means for preventing generation of a warning signal unless the sensed oil pressure continuously remains below the selected alarm value for at least a predetermined time period.

3. An engine oil pressure monitor comprising:
means for sensing engine speed;
means for sensing engine oil pressure;
means for generating a first oil pressure alarm value corresponding to engine speeds in a non-zero low engine speed range;
means for generating a second oil pressure alarm value corresponding to engine speeds in a high engine speed range;
means for generating a variable pressure alarm value which is proportional to engine speeds in an intermediate range between the low and high engine speed ranges;
means for selecting one of the oil pressure alarm values, the selected alarm value corresponding to the engine speed range which contains the sensed engine speed;
means for comparing the sensed oil pressure to the selected alarm value and for generating warning signals when the sensed oil pressure is less than the selected alarm value; and
means for preventing generation of a warning signal when the sensed engine speed is below the low engine speed range.

* * * * *